United States Patent [19]
Perslow et al.

[11] Patent Number: 6,132,614
[45] Date of Patent: Oct. 17, 2000

[54] MODULAR WASTEWATER TREATMENT SYSTEM

[75] Inventors: Johan A. Perslow, Palm Desert; Mark E. Krebs, Huntington Beach; James A. Matthews, Lake Forest, all of Calif.

[73] Assignee: Pacific Advanced Civil Engineering, INC, Huntingon Beach, Calif.

[21] Appl. No.: 09/168,543

[22] Filed: Oct. 8, 1998

Related U.S. Application Data

[63] Continuation-in-part of application No. 08/980,040, Nov. 26, 1997, abandoned.

[51] Int. Cl.$^7$ .................................................. C02F 3/00
[52] U.S. Cl. ..................... 210/605; 210/613; 210/620; 210/626; 210/239; 210/607
[58] Field of Search ................................. 210/601, 605, 210/607, 613, 620, 625, 626, 631, 202, 220, 239, 600

[56] References Cited

U.S. PATENT DOCUMENTS

| | | |
|---|---|---|
| 2,137,966 | 11/1938 | Rankin . |
| 2,528,649 | 11/1950 | Genter et al. . |
| 2,528,887 | 11/1950 | Kiekhoefel et al. . |
| 2,580,764 | 1/1952 | Gunz . |
| 3,355,019 | 11/1967 | Mitchell . |
| 3,429,806 | 2/1969 | Carter et al. . |
| 3,444,076 | 5/1969 | Sekikawa et al. . |
| 3,563,382 | 2/1971 | Regent . |
| 3,673,082 | 6/1972 | Reid . |
| 3,679,053 | 7/1972 | Koulovatos et al. . |
| 3,844,946 | 10/1974 | Farrell, Jr. . |
| 3,875,056 | 4/1975 | Inglis . |
| 3,920,550 | 11/1975 | Farrell, Jr. et al. . |
| 3,948,774 | 4/1976 | Lindman . |
| 4,036,754 | 7/1977 | Peasley . |
| 4,179,366 | 12/1979 | Kaelin ..................................... 210/620 |
| 4,251,365 | 2/1981 | Speece . |
| 4,287,062 | 9/1981 | Von Nordenskjöld ................... 210/220 |
| 4,622,134 | 11/1986 | Kobayashi . |
| 4,664,792 | 5/1987 | Fors et al. ............................... 210/600 |
| 5,011,605 | 4/1991 | Pape et al. . |
| 5,342,523 | 8/1994 | Kumshima .............................. 210/620 |
| 5,472,611 | 12/1995 | Von Nordenskjöld et al. ........ 210/626 |
| 5,534,141 | 7/1996 | McAnancy et al. .................... 210/202 |
| 5,811,008 | 9/1998 | Von Nordenskjöld .................. 210/605 |
| 5,811,011 | 9/1998 | Ciszczon et al. ....................... 210/620 |

FOREIGN PATENT DOCUMENTS 2454428  4/1980  France .

OTHER PUBLICATIONS

USEPA Process Design Manual for Upgrading Existing Wastewater Treatment Plants, pp. 1–1 to 1–2, 5–1 to 5–20; 11–17 to 11–24, Oct. 1974.

*Primary Examiner*—Christopher Upton
*Attorney, Agent, or Firm*—Christie, Parker & Hale, LLP

[57] ABSTRACT

A modular system for treating wastewater is designed having different phases. In an initial phase, plural tanks are provided, including at least one reactor and digester tank. In a subsequent phase, at least one of the tanks is converted into a different type of tank, and additional new tanks are provided to accommodate larger quantities of wastewater. In one embodiment, conversion of at least one of the tanks is accomplished by removing a temporary wall from a digester tank to create another reactor tank.

1 Claim, 7 Drawing Sheets

MODULAR WASTEWATER TREATMENT SYSTEM

CROSS-REFERENCE TO RELATED APPLICATIONS

The present invention is a continuation-in-part of U.S. patent application Ser. No. 08/980,040, filed Nov. 26, 1997, and entitled MODULAR WASTEWATER TREATMENT SYSTEM, now abandoned.

BACKGROUND OF THE INVENTION

1. Field of the Invention

The present invention relates to systems for treating wastewater and, more particularly, to wastewater treatment systems that are modular in design.

2. Description of the Prior Art

Treating wastewater is important for a number of reasons. As the world's population grows, the amount of water needed for consumption and other use continues to increase, while the amount of naturally available water remains the same. Thus, there is an ever increasing demand for usable, clean water, making the reclamation of tainted water extremely important.

In addition, as existing metropolitan areas become more crowded, developers are encouraged to construct new housing in previously undeveloped areas. Many such areas lack sufficient water for consumption, irrigation and similar purposes, necessitating the reclamation and reuse of available water resources.

One source of potentially reclaimable water is sewage from the residential use of water, commonly referred to as wastewater. Residential wastewater has a high water content, but requires substantial processing before it can be reused because of the human waste and other contaminants mixed with it.

A number of different systems have been proposed for treating sewage or wastewater. One such system, disclosed in U.S. Pat. No. 2,528,649, incorporates a simple sedimentation tank for separating solid waste, or "sludge", from water. The sludge is then passed to a digestion system where it is allowed to settle so that clear aqueous liquid separates from the sludge. The clear liquid is redirected back to the sedimentation tank. Unfortunately, this system suffers from a number of shortcomings that make it inefficient. First, the system makes no provision for increases in the volume of incoming sewage, either during high flow periods or as a community expands and therefore creates a larger amount of wastewater. In time, another complete treatment system would be required to handle the additional wastewater, resulting in unwanted expenses for the community. The system also incorporates a relatively crude sedimentation tank that merely allows the influent sewage to separate and does not aerate or facilitate processing of the sewage in any other way.

Another wastewater treatment system, described in U.S. Pat. No. 3,679,053 to Koulovatos et al., has three processing tanks for, respectively, receiving, aerating, and settling influent raw sewage. This system also fails to account for the possibility that the amount of influent sewage will increase over time. In addition, the disclosed system provides no overflow protection in case of large transient increases in the amount of sewage to be treated.

Yet another wastewater treatment system is disclosed in U.S. Pat. No. 3,920,550 to Farrell, Jr., et al. The Farrell system also has an aerobic and settling tank for aerating wastewater, and includes a sludge tank for receiving and further processing sludge separated from the supernatant water. However, it makes no provision for increases in the quantity of wastewater as a developing community expands. In addition, there is no disclosure of a plurality of parallel treatment tanks, nor of a system for controlling the operation of such tanks.

Accordingly, there is a need for a wastewater treatment system designed to accommodate increasing quantities of wastewater without requiring that an entirely new system be built. In addition, a need exists for a sewage treatment system that is designed and operated to be energy efficient. The present invention addresses these needs and others.

SUMMARY OF THE INVENTION

Briefly, and in general terms, the present invention is directed to a multi-phase system and method for treating wastewater. In an initial phase, the system is designed to treat a relatively small amount of wastewater, and includes at least one reactor tank and at least one other tank. The reactor tank processes the wastewater such that it separates into sludge and relatively clean water. The sludge is directed to the other tank for further processing.

In a subsequent phase (for treating larger quantities of wastewater), either the existing reactor tank is converted to a different type of tank, or the other tank is converted to another reactor tank, and additional reactor and/or digester tanks are provided. The number and size of those tanks is dependent upon the amount of additional wastewater to treat. In this manner, the costs of the system can be spread over several years, and the tanks built in the initial phase are all incorporated into the subsequent phases. In that manner, the footprint of the overall system is relatively small.

Thus, in one illustrative embodiment, the method of the present invention includes the steps of: providing plural tanks in an initial phase, including at least one reactor tank and at least one other tank; directing wastewater into the reactor tank for processing of the wastewater; directing waste from the reactor tank to the other tank for further processing; in a subsequent phase, converting one of the reactor tank and other tank into, respectively, a different type of tank or a reactor tank, and providing at least one more reactor tank or other tank; directing wastewater into the one or more reactor tanks for processing of the wastewater; and directing waste from the one or more reactor tanks to the one or more other tanks for further processing of the waste.

The system of the present invention is directed to a multi-phase system for treating wastewater, including: plural tanks, including at least one reactor tank and at least one digester tank; wherein at least one of the tanks is convertible for performing a first wastewater treatment function in an initial phase and a second wastewater treatment function in a subsequent phase.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENTS

Figure 1:
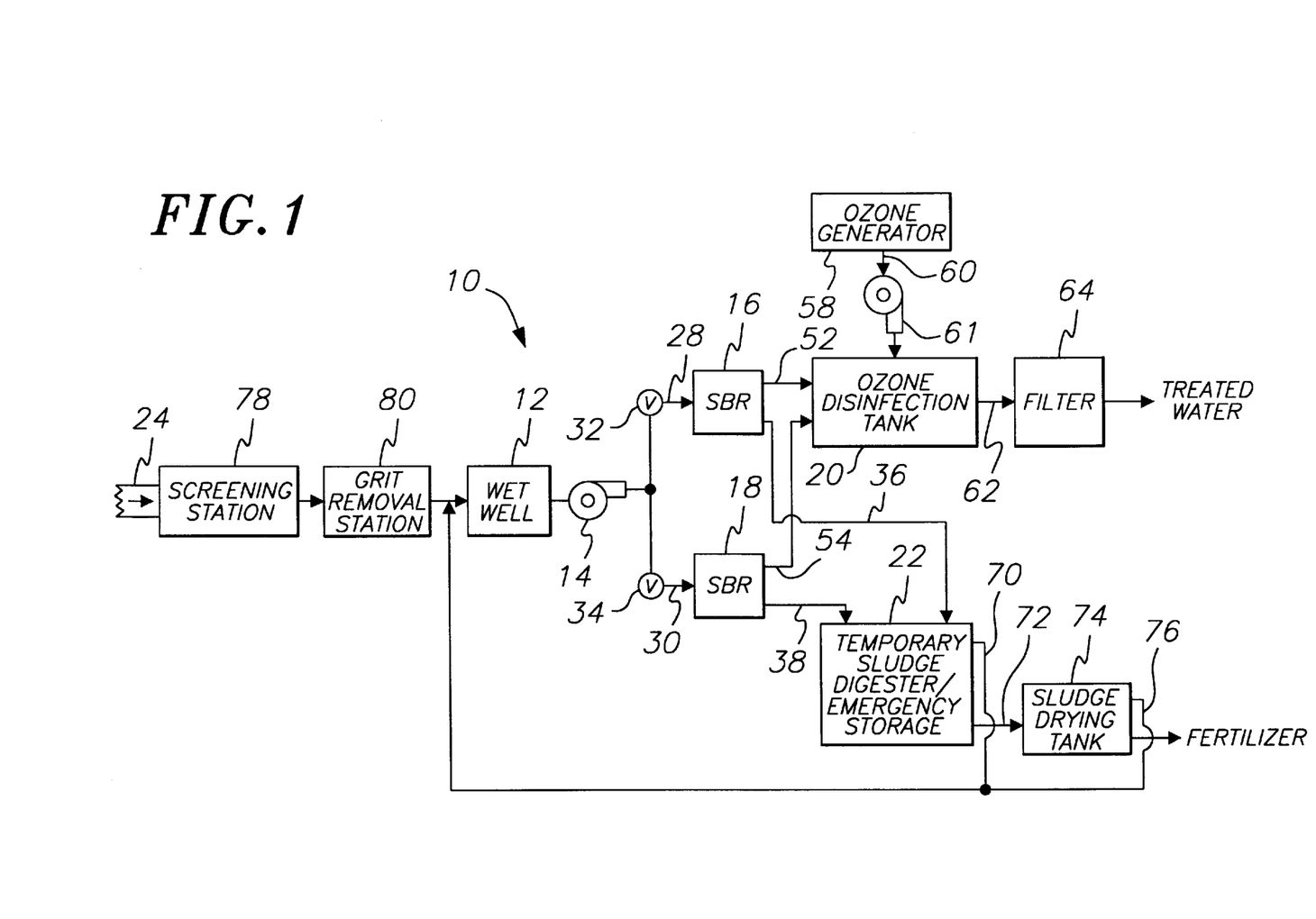
FIG. 1 is a simplified block diagram of a modular wastewater treatment system embodying the present invention and depicting an initial phase of the system.

In the following detailed description, like reference numerals are used to refer to like or corresponding elements in the different figures of the drawings. Referring now to FIG. 1, there is shown a modular wastewater treatment system 10 embodying the present invention. The system illustrated in FIG. 1 depicts an initial or "Phase I" system, as described in greater detail below. The system 10 comprises, generally, a wet well 12, a pump 14, a pair of reactor tanks 16 and 18 that preferably comprise sequencing batch reactors ("SBR's"), an optional disinfection tank 20, and a temporary sludge digester 22. The disinfection tank is preferably an ozone disinfection tank, but can also take any of a variety of other forms known in the art.

The wet well 12 preferably comprises a tank connected to a sewage inlet line 24 that conducts influent wastewater from an external wastewater-producing source to the wet well. The wet well is also connected to an outlet line 26 for conducting wastewater from the wet well. In a preferred embodiment, the wet well 12 is oversized in the initial phase to accommodate increasing quantities of wastewater in subsequent phases, as described in greater detail below.

The wastewater exiting the wet well 12 is preferably pumped by means of the pump 14 to one of the SBR's 16 or 18 through lines 28 and 30. The flow of wastewater is controlled by a pair of valves 32 and 34, and discharged above the high water level of the SBR to ensure that wastewater in the SBRs cannot flow back to the wet well. The valves are opened individually to direct wastewater flow to only one of the SBR's at a time.

Figure 4:
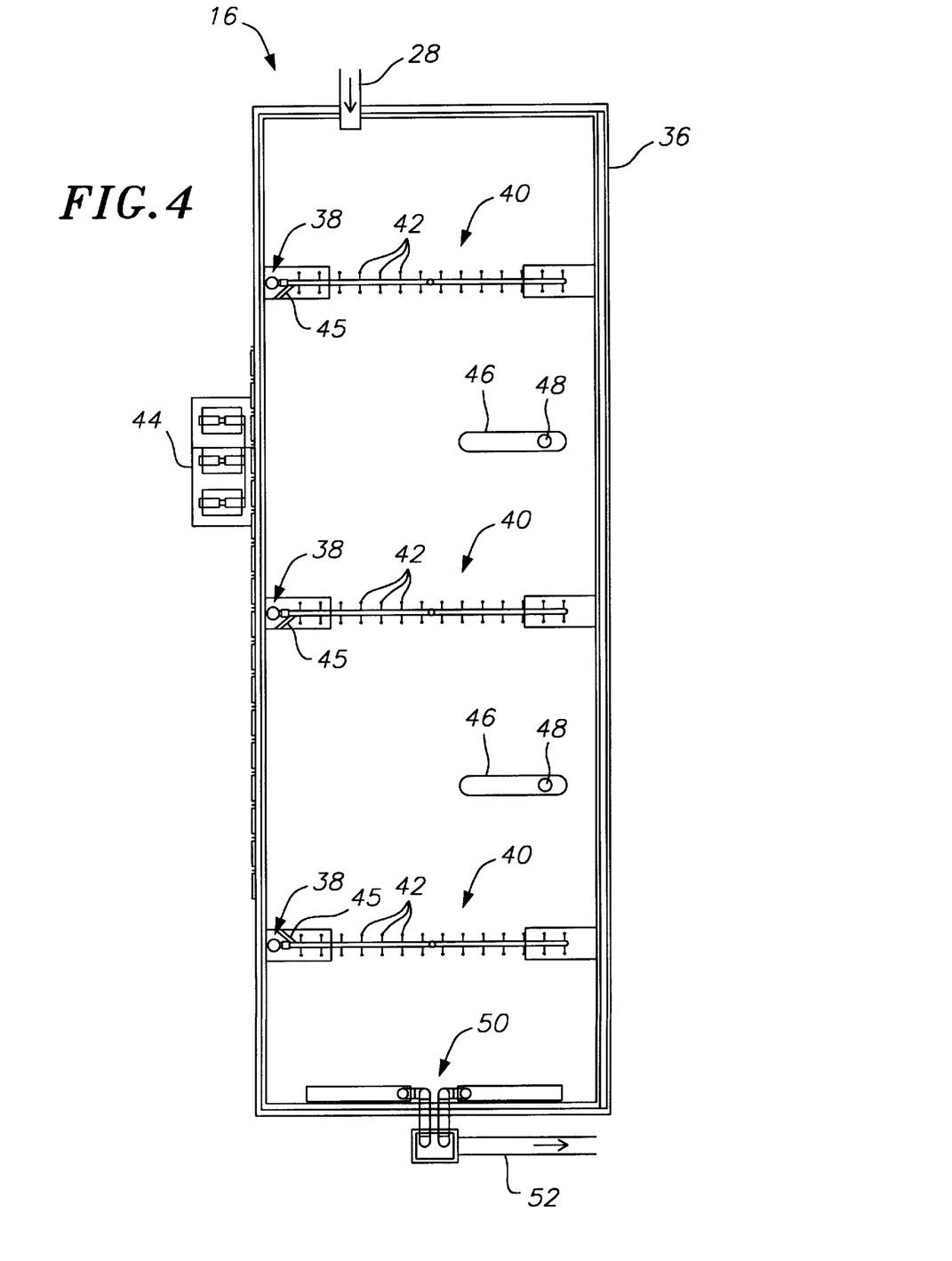
FIG. 4 is a plan view of a sequencing batch reactor incorporated in a preferred embodiment of the present invention.

The SBR's 16 and 18 are preferably in the form of relatively large, elongated tanks 36 (FIG. 4) that receive wastewater from the respective fluid lines 28 and 30. Because the two SBR's are identical for all relevant purposes, only one tank is shown in FIG. 4. The tanks are elongated so that the wastewater entering the tanks at one longitudinal end travels through a relatively long path in the tanks, and is therefore subjected to substantial processing. Each SBR includes one (and preferably a minimum of two) mixing pumps 38 located inside the tank for agitating the wastewater therein. In addition, each SBR tank includes at least one (and preferably a minimum of two) aeration manifolds 40, each with a plurality of outlet nozzles 42, the manifolds being coupled to a source of air under pressure (for example, one or more blowers 44 via air lines 45) to receive air therefrom. Furthermore, the mixing pumps 38 are connected to the respective aeration manifolds for communication therewith. Thus, the manifolds receive air from the blowers as well as wastewater from the pumps, and the air and wastewater are mixed together and ejected through the outlet nozzles. A plurality of such aeration manifolds are preferably provided at spaced locations along the length of the tank. In the preferred embodiment, multiple mixing pumps 38 and multiple aeration manifolds 40 provide installed backup capability for the system.

One or more troughs 46 are preferably provided at the bottom of the SBR tanks 16 and 18 for collecting and removing sludge that settles in the tanks. The troughs include passages 48 connected to effluent lines 36 and 38 (FIG. 1) for conducting the sludge from the SBR tanks, either by gravity feed or pumping. The SBRs further include decanting plumbing 50 located at one longitudinal end of the tank for removing relatively clean water from the SBR. The decanting plumbing preferably extends no more than six feet down into the tank so that it removes only relatively clean water located at the top of the tank. The SBR tanks may optionally be provided with at least one dissolved oxygen sensor (not shown) for monitoring the level of dissolved oxygen in the wastewater in order to maintain that level within a selected range, thereby optimizing treatment and minimizing power consumption.

As known in the art, the SBR's 16 and 18 are operated in a repeating sequence of steps or "stages". Initially, the SBR tank is filled with unprocessed wastewater. During the filling stage, the mixing pumps and sources of air under pressure are periodically activated to agitate and aerate the incoming wastewater. When the mixing pumps and sources of air are activated simultaneously, the SBR is performing aerobic mixing. When only the mixing pumps are activated, the SBR is performing anoxic mixing of the wastewater. In either case, the SBR is in an operating mode.

After one of the SBR's 16 has been filled with wastewater, the SBR enters the react stage, during which aerobic and anaerobic mixing is periodically performed to further aerate and agitate the wastewater. After the react stage, the SBR enters the settling stage, in which the tank is essentially inactive, allowing the waste (or sludge) in the wastewater to settle to the bottom of the tank and leaving relatively clear water in the upper portion of the tank. After the wastewater settles, the SBR enters the decant stage, in which water at the top of the tank is removed by the decanting plumbing 50 (FIG. 4) and conducted along lines 52 and 54 (FIGS. 1 and 4), either by means of gravity feed or a pump. Valves and/or pumps (not shown) are provided in lines 52 and 54 for this purpose. The sludge at the bottom of the tank is collected in the spaced apart troughs 46 and is conducted along lines 36 and 38, again either by gravity feed or by pumping.

Figure 5:
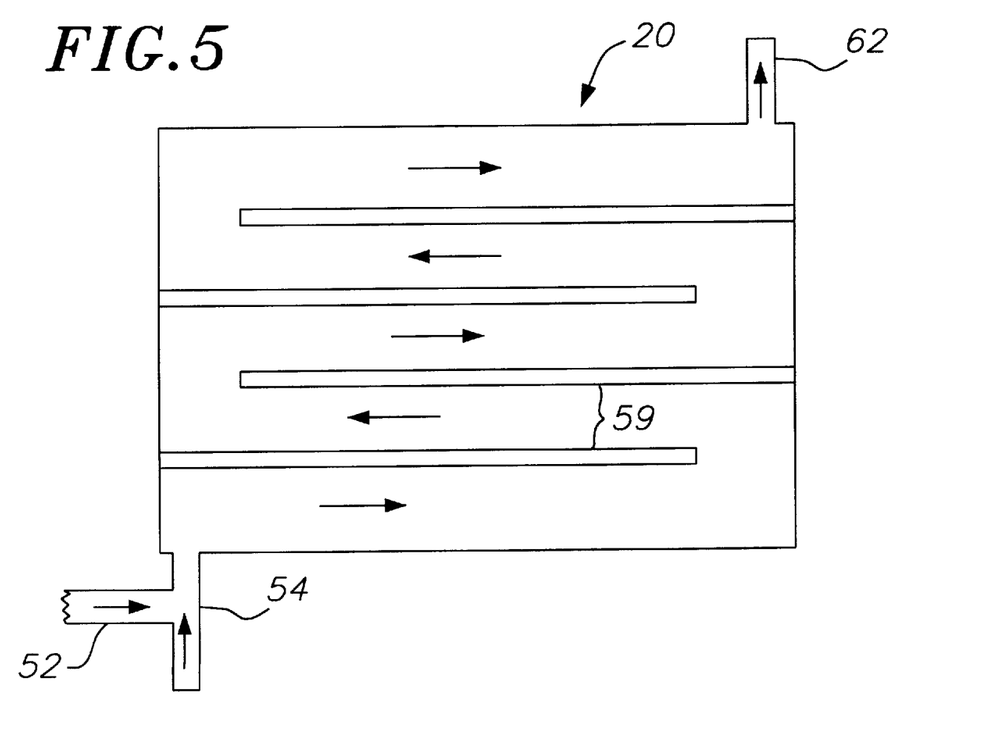
FIG. 5 is a plan view of a disinfection tank incorporated in a preferred embodiment of the present invention.

The lines 52 and 54 conduct the processed water to the disinfection tank 20 (FIGS. 1 and 5), which is preferably connected to an ozone generator 58 via a line 60. The volume of the disinfection tank is preferably approximately 1.5 times the volume of liquid decanted each time from the SBR's, to eliminate "short circuiting" of the disinfection tank and maximize disinfection. The processed water is injected with ozone pumped into the disinfection tank by a pump 61 in order to disinfect it. It is well known that ozone acts as a disinfectant and is a bacterial and viral oxidant. As known in the art, the disinfection tank may include a plurality of spaced apart partitions 59 (FIG. 5), each of which is connected to an alternating one of the side walls to define a zig-zag or switchback circulation system through the tank. Processed water then enters the disinfection tank at one corner via one of the lines 52 or 54, flows through the circulation system while being injected with ozone, and is removed from the tank at the diagonally opposite corner through a line 62.

The processed and disinfected water exiting the disinfection tank 20 is conducted along the line 62 and preferably passes through a filter 64 to remove suspended solids before it is reused. The filter in one embodiment is in the form of a rapid sand filter. The water exiting the filter is made available for reuse in irrigation or other suitable applications.

As described above, the SBR tanks 16 and 18 operate to separate relatively clean water from waste or sludge. The sludge collects in the troughs 46 and is conducted either by gravity or by means of pumping along lines 36 and 38 to the temporary sludge digester 22, which also serves as emergency storage. The temporary sludge digester stores the sludge and allows it to settle further. As this occurs, additional water, known as supernatant decant liquid, rises to the top of the holding tank and is conducted back to the wet well 12 by way of a return line 70. The supernatant decant liquid is then mixed with incoming, unprocessed wastewater entering the wet well, and is processed again by the SBR tanks 16 and 18. The sludge at the bottom of the holding tank is conducted through a line 72 to a sludge drying tank 74 that allows the sludge to settle even further. Any supernatant decant at the top of the drying tank is similarly conducted back to the wet well 12 along a return line 76. The sludge in the drying tank is made available for use in land applications, i.e. as fertilizer and the like.

The wastewater treatment system 10 preferably includes a screening station 78 and a grit removal station 80, both of which are located either upstream or immediately downstream of the wet well 12. The screening station preferably includes a static screen for removing relatively large objects from the influent wastewater. The screening station may also include an automatic wash-down system for periodically cleaning the screen. The grit removal station is provided to remove volume reducing sediment in the wastewater, thereby improving the waste sludge quality and reducing the quantity thereof. In one embodiment, the grit removal station may take the form of a system available from Fluidyne of Cedar Falls, Iowa, under the name "Hydro-Grit".

It is a feature of the wastewater treatment system 10 in one preferred embodiment that it be constructed and operated in different phases. The system depicted in FIG. 1 shows the system of "Phase I", in which the pair of SBR tanks 16 and 18 are relatively small in size and are therefore capable of processing relatively small amounts of wastewater. Such a system is ideal for a developing community that initially generates very little wastewater. The "Phase I", system is relatively inexpensive and occupies a limited area. Thus, the investment required to build the system is small, which is preferable for a community just beginning to grow.

Figure 2:
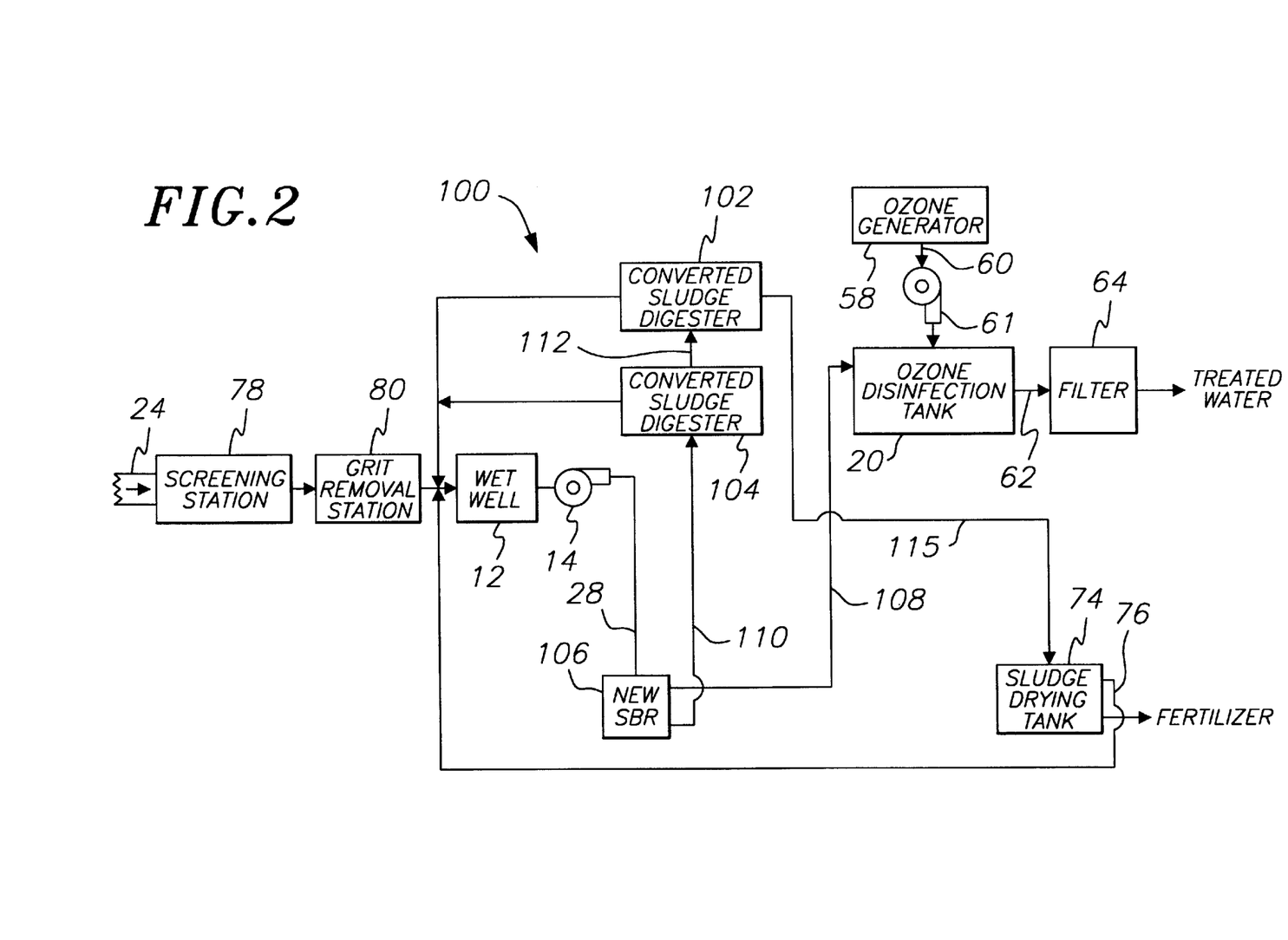
FIG. 2 is a simplified block diagram similar to FIG. 1 but showing the system of FIG. 1 in a subsequent phase.

As the community grows and the amount of wastewater generated by the community approaches the maximum daily capacity of the Phase I system, the system is preferably converted to a Phase II system, as designated 100 in FIG. 2. In this process, the original SBR tanks 16 and 18 are converted to sludge digester tanks 102 and 104, and one or more new SBR tanks 106 are provided, the new tanks having a larger capacity for meeting the increased needs of the community. The remaining components of the Phase I system 10 are the same, except for the temporary sludge digester 22, which is either deleted or used as emergency storage in Phase II. The wet well 12 is connected with the SBR tank 106 via the line 28, and a new line 108 connects the SBR tank 106 with the disinfection tank 20 for conducting treated water to the disinfection tank. A new line 110 connects the SBR tank 106 with one of the converted sludge digester tanks 102 for directing sludge thereto, and a line 112 connects the two converted sludge digester tanks 102 and 104 in series. The downstream sludge digester tank 104 is connected to the sludge drying tank 74 by way of a line 115.

The sludge digester tanks 102 and 104 preferably include at least one aeration manifold similar to that included in the SBR tanks, such that the sludge digester tanks allow both gravity thickening and aerobic digestion of the sludge to take place inside the sludge digesters. This is preferable because aerobic digestion not only produces high quality, stabilized sludge, but also alleviates many of the odor problems associated with anaerobic digestion. The pair of sludge digester tanks are preferably connected in series to improve the sludge digestion process and thereby reduce the volume of the sludge.

Thus, the Phase II system 100 utilizes most or all of the components of the Phase I system 10, the only additional component being the new SBR tank 106 or a plurality of SBR tanks depending on the quantity of wastewater to be treated. Thus, the modular design of the present invention allows for future expandability of the system and reduces the land area required for subsequent phases.

Several of the components utilized in both Phases I and II are constructed to be oversized in Phase I and thus capable of handling the additional quantity of wastewater in subsequent phases. In particular, the wet well 12 is made significantly larger than necessary for Phase I operation, and thus provides flow equalization to the rest of the system regardless of the flow rate in the wastewater inlet line 24 at any given time. The relatively large wet well allows it to be universal for all phases of the system. In addition, the disinfection tank 20 is preferably made large in the first phase to accommodate larger amounts of treated water in 0o 0subsequent phases.

Although the Phase I system 10 is shown in FIG. 1 as having two SBR tanks 16 and 18, it will be apparent that the Phase I system may take different forms. For example, a Phase I system may have only one SBR tank of a suitable size for processing the wastewater generated by a community, with the wet well serving as a temporary storage tank for untreated wastewater during the react, settle and decant periods. The Phase I system may also include a permanent sludge digester tank in place of the temporary sludge digester 22. Then in Phase II, the original SBR tank is converted to a second sludge digester tank, and one or more large SBR tanks are built to accommodate the increased quantity of wastewater received by the system. Thus, the embodiments described herein are meant solely to serve as examples of the modular wastewater treatment system of the present invention, and are not the only embodiments encompassed by the present invention.

The SBR tanks 16 and 18 and ozone disinfection tank 20 in the Phase I system 10 are preferably formed below ground, whereas the SBR tank 106 of Phase II and all subsequent tanks are preferably formed above ground. Thus, in Phase II when the SBR tanks 16 and 18 are converted to sludge digester tanks, the sludge at the bottom of the new SBR tank 106 is gravity fed to the converted sludge digester tanks. In addition, the processed water at the top of the SBR tank 106 is gravity fed to the disinfection tank 20.

As an example of the dimensions for the various tanks of the systems 10 and 100, assume a Phase I requirement that the system process 30,000 gallons of wastewater per day, and a Phase II requirement that the system process 150,000 gallons per day. The Phase I system is preferably constructed with a single SBR tank having a capacity of 33,000 gallons, a wet well with a capacity of 4,500 gallons, a sludge digester having a capacity of 33,000 gallons, and an ozone disinfection tank with a capacity of 36,000 gallons. In the Phase II system the original SBR tank is converted to a second sludge digester tank, and a pair of new SBR tanks are provided, each of which has a capacity of 85,000 gallons.

Figure 3:
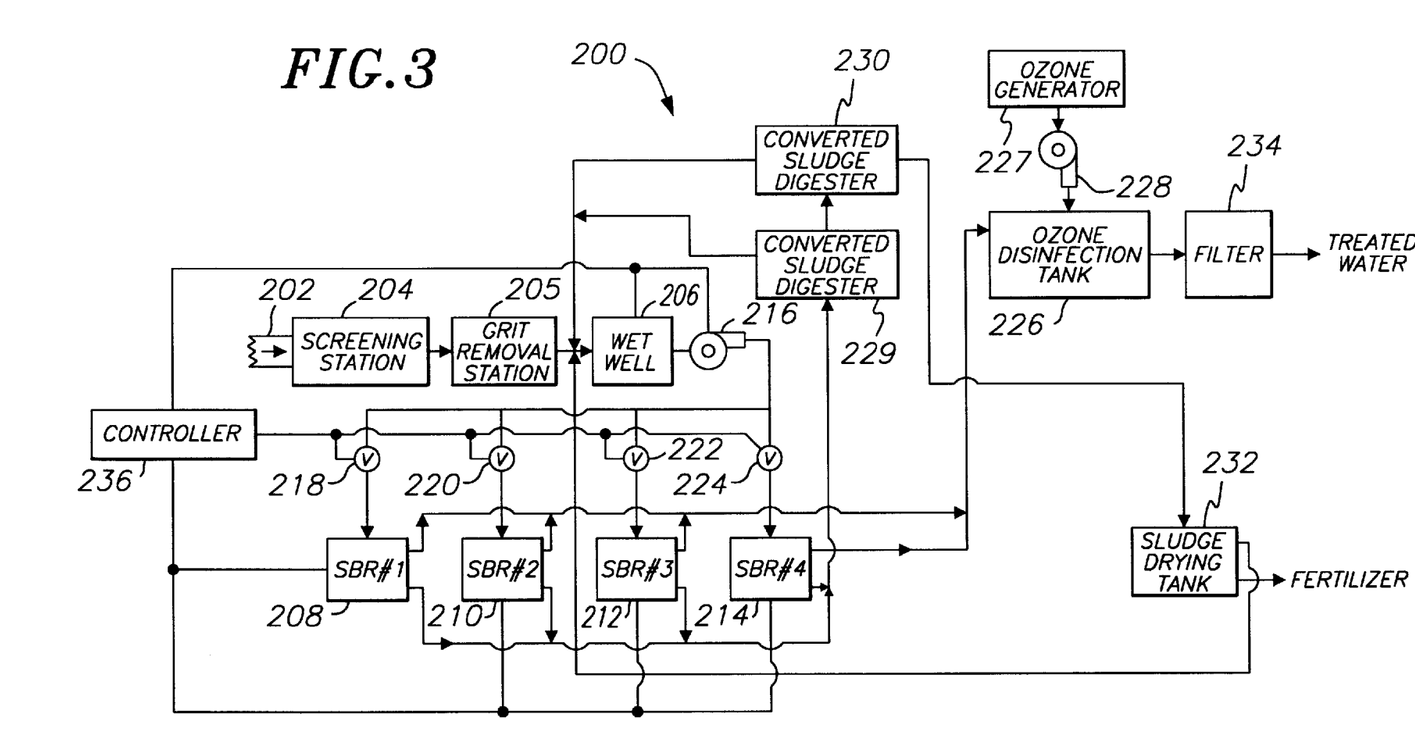
FIG. 3 is a simplified block diagram of an alternate embodiment of the system of the present invention.

Referring now to FIG. 3, there is shown an alternative embodiment of the wastewater treatment system 200 of the present invention. The system 200 includes a sewage inlet line 202, a screening station 204, and a grit removal station 205, all of which are upstream of a wet well 206. The system further includes a plurality of SBR tanks, in this case four tanks 208, 210, 212, and 214. Wastewater in the wet well is conducted to the various SBR tanks by means of a pump 216 and on-off valves 218, 220, 222, and 224. The SBR tanks are connected to a disinfection tank 226 with an ozone generator 227 and a pump 228, and to a converted sludge digester tank 229 which in turn is connected to a second converted sludge digester tank 230. The second converted sludge digester tank conducts its concentrated sludge output to a sludge drying tank 232, while the disinfection tank 226 is connected to a filter 234. Thus, the system 200 defines a Phase II system, in which a pair of original SBR tanks have been converted to the sludge digester tanks 228 and 230.

The system 200 further includes a controller 236 electrically coupled with the wet well 206, the pump 216, the on-off valves 218, 220, 222, and 224, and the SBR tanks 208, 210, 212, and 214. The controller is programmed to actuate the pump, open or close the respective valves, and control the stage of each of the SBR tanks, including actuating the appropriate blowers and mixing pumps associated with the respective SBR tanks. For example, when the first SBR tank enters the filling stage, the controller opens the on-off valve 218 and actuates the pump 216 to pass wastewater from the wet well 206 to that SBR tank.

Simultaneously, the controller actuates the mixing pumps and the blower associated with the first SBR tank to perform anoxic and aerobic mixing of the wastewater entering the first SBR tank. Similarly, during the decant stage for the first SBR tank, the controller opens a valve (not shown) connected to the tank 208 for a predetermined period of time to allow the relatively clean water at the top of the tank 208 to flow by gravity to the sludge digester tank 229. The controller is programmed to actuate each pump and blower, and to open or close the respective valves, as well as with the duration and timing of each event.

In a preferred embodiment, the controller 236 is programmed to actuate the pumps and blowers of only one SBR tank at any given time, causing the pumps and blowers associated with at least three of the four tanks to be dormant at any given time. This results in a system having a relatively low rate of energy consumption at all times. For example, a typical SBR tank requires approximately 200 Amperes of current in its operating mode, while the other components of the system together require approximately 200 Amperes of additional current. Thus, the system requires a total of only about 400 Amperes in order to operate.

The one-at-a-time operation of the SBR tanks provides additional benefits, as well. For example, most wastewater treatment systems are required to provide a generator as a source of backup power. Thus, a conventional 5stem with additional SBR tanks which can run simultaneously must have a much larger backup generator to meet the increased energy needs of the system. The system of the present invention, on the other hand, may be provided initially with a 400 Ampere-hour generator and, as additional SBR tanks are added, continue to use the same generator because the energy needs of the system at any given time will not increase.

The controller 236 preferably comprises a processor programmed to actuate the pumps and blowers at selected times and for selected periods of time. Thus, the processor preferably includes an internal clock. In a preferred embodiment, the filling stage for each SBR tank lasts approximately one and one half hours, the react stage lasts approximately two hours and fifty minutes, the settling stage lasts approximately forty minutes, and the decant stage lasts approximately one hour. The controller is programmed with this information, as well as information corresponding to the required actuation of the various pumps, blowers, and valves. The mixing pumps are preferably actuated during the first twenty minutes, between the fortieth and fiftieth minutes, and during the last ten minutes, of the filling stage. The mixing pumps are also actuated between the twentieth and thirtieth minutes, between the fiftieth and seventieth minutes, between the one hundred twentieth and one hundred thirtieth minutes, and during the last ten minutes, of the react stage. The blowers are preferably actuated at the same time as the mixing pumps, except that during the first twenty minutes of the filling stage, the blowers are inactive. Thus, for a tank system having four SBRs with the above-mentioned stage durations and pump and blower actuations, only one SBR tank will have its pumps or blowers actuated at any given time.

It has been found that the systems 10 and 100 of the present invention provide a very high quality effluent, regardless of the quality of the incoming wastewater. Untreated wastewater almost always is within a certain range in terms of the impurities contained in the wastewater. For example, the Biological Oxygen Demand (BOD) is typically within a range of 200–400 milligrams per liter, Total Suspended Solids (TSS) are typically about 200–300 milligrams per liter, and Total Nitrogen (TN) is typically about 30–50 milligrams per liter. No matter where these values fall within the above ranges, it has been found that the systems of the present invention produce an effluent water that is sufficiently pure to meet governmental requirements. Thus, in designing a system, the only variable that must be taken into account is the quantity of incoming wastewater. The BOD, TSS, and TN of the wastewater need not be considered.

Figure 6:
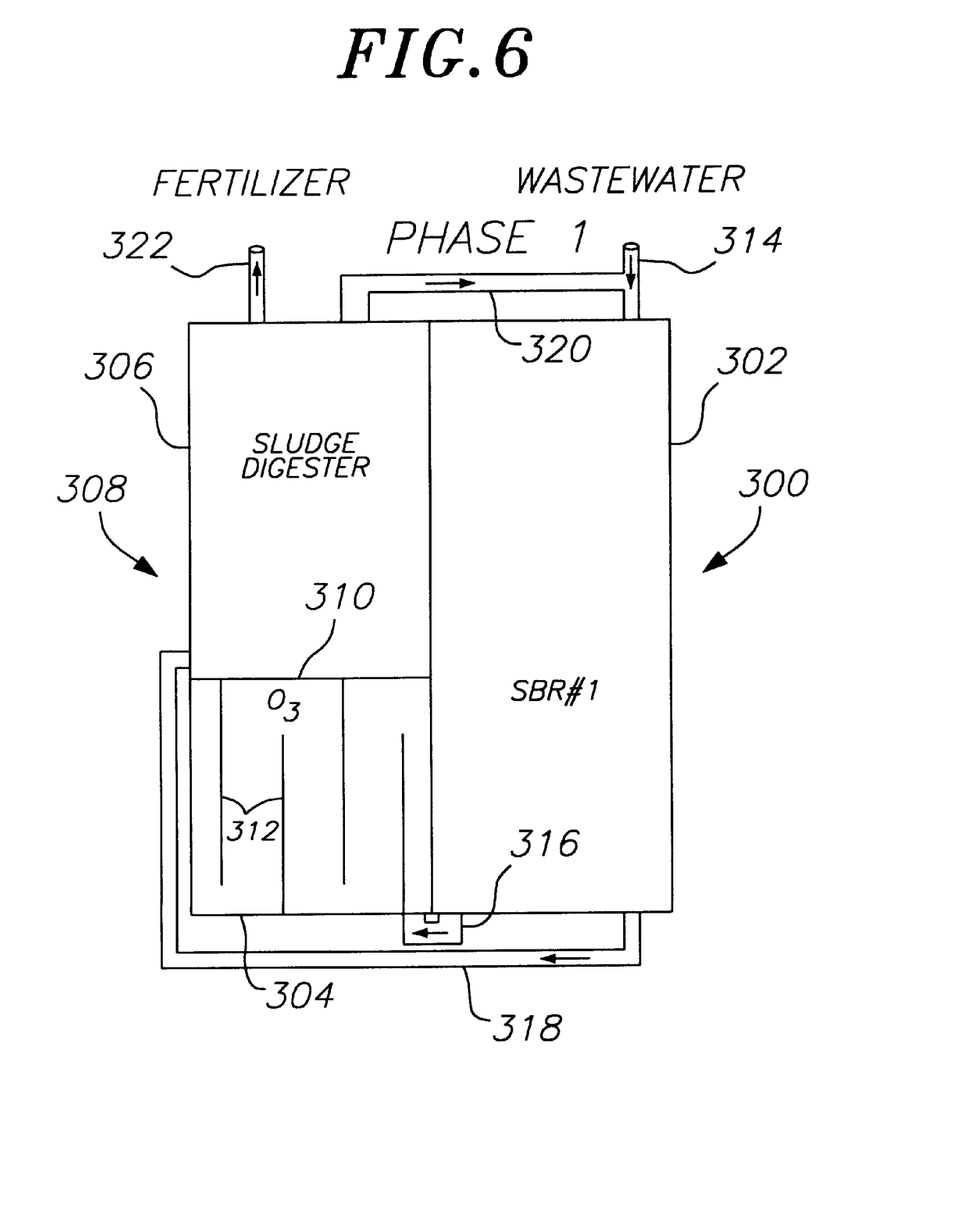
FIG. 6 is a simplified block diagram of another illustrative embodiment of a modular wastewater treatment system of the present invention, depicting an initial phase of the system.
Figure 7:
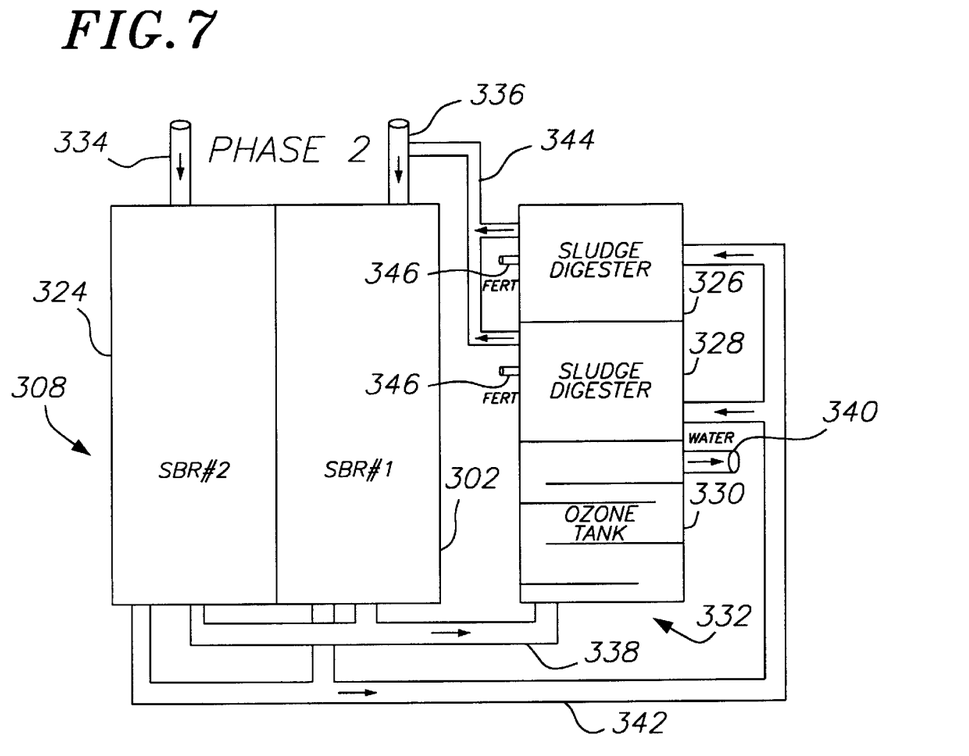
FIG. 7 is a simplified block diagram similar to FIG. 6, showing the system in a subsequent phase.

Referring now to FIGS. 6 and 7, there is shown another illustrative embodiment of the modular wastewater treatment system 300 and method of the present invention. In FIG. 6, the system 300 is shown in an initial phase ("Phase I"), while in FIG. 7 the system is shown after modification in a subsequent phase ("Phase II"). In Phase I, the system 300 preferably includes one SBR 302, one ozone disinfection tank 304, and one sludge digester tank 306.

In the illustrative embodiment, the ozone tank and digester tank occupy a single tank 308, which is partitioned by a temporary wall 310 to separate the ozone tank from the digester tank. As described above in connection with the embodiment of FIG. 1, the ozone tank preferably includes baffles or partitions 312 in a staggered configuration to form a zig-zag circulation system through the ozone tank. The principal difference between the baffles 312 FIG. 6 and the baffles of FIG. 1 is that the former are merely temporary.

Thus, in phase I the untreated wastewater is delivered to the SBR 302 from a wet well (not shown) via a conduit 314. In the SBR, the wastewater is processed such that it separates into waste (or sludge) and relatively clean water, as described above in connection with the embodiment of FIG. 1. The relatively clean water is conducted from the SBR to the ozone disinfection tank 304 through a conduit 316, where it is injected with ozone pumped into the tank for disinfection purposes. The disinfected water is then removed from the tank through a conduit (not shown) for use as desired.

The sludge in the SBR is conducted through a conduit 318 to the sludge digester tank 306, where the sludge is allowed to settle such that supernatant decant liquid separates from the sludge and rises to the top of the tank. The supernatant decant liquid is then conducted back to the SBR through a conduit 320, or alternatively is conducted back to the wet well (not shown) for mixing with incoming, untreated wastewater, the mixture then being conducted to the SBR through the conduit 314. The sludge is removed from the sludge digester through conduit 322 and is dried for use as fertilizer or the like.

As the quantity of incoming wastewater increases, the system 300 is modified into a "Phase I" system. In order to modify the system, in the illustrative embodiment the temporary wall 310 and temporary baffles 312 are removed, and the appropriate blowers and agitators are mounted in the tank 308 to transform it into a second SBR tank 324. Additional sludge digester tanks 326 and 328 and ozone disinfection tank 330 are also provided. Those tanks may be formed from a single tank 332 that is partitioned into sections, or may comprise discrete tanks.

The system 300 operates in Phase II in a similar manner to the operation in Phase I. Incoming wastewater is conducted from a wet well (not shown) through respective conduits 334 and 336 to the SBRs, where the wastewater is processed. The relatively clean supernatant water in the SBRs flows through conduit 338 to the ozone tank 330 where it is disinfected. The disinfected water is conducted through conduit 340 to the site of its intended use.

The sludge in the SBRs 302 and 324 flows through a conduit 342 to the respective sludge digester tanks 326 and 328, where the sludge is allowed to settle. The supernatant decant liquid flows through conduit 344 back to the wet well (not shown) or directly back to one or both of the SBRs. The waste at the bottom of the sludge digester tanks is conducted through respective conduits 346 to be dried for use as fertilizer or the like.

It will be apparent that the system 300 has a relatively small footprint, both in Phase I and in subsequent phases. Initially, the system is of a size to accommodate an emerging community, and is therefore relatively small when compared with the size required for a mature community. It is larger than a typical Phase I installation of the system 10, however, due to its unique design. As the community expands, the system 300 is modified to handle the increasing quantities of wastewater, while the system uses the existing tanks from Phase I.

It will also be apparent that in transitioning from Phase I to Phase II of the system 300, an SBR may be converted into an ozone tank or sludge digester, an ozone tank may be converted into an SBR or sludge digester, and/or a sludge digester may be converted into an SBR or ozone tank. For example, an SBR tank with a capacity of 100,000 gallons may be of suitable capacity for a sludge digester in a subsequent phase, and thus the SBR may be converted into a sludge digester when the system enters a new phase, and one or more additional SBR tanks are then incorporated into the system.

As one illustrative embodiment, assume a system that must handle 125,000 gallons per day ("GPD") in Phase I, and 250,000 GPD in Phase II. In Phase I, the system includes one SBR with a capacity slightly higher than 125,000 gallons, for example 138,000 gallons. A sludge digester with a capacity of approximately 100,000 gallons is provided, for example one with a capacity of 92,000 gallons. An ozone disinfection tank with a capacity of about 50,000 gallons, for example 46,000 gallons, is also provided. Thus, the tank 308 is preferably partitioned in such a manner that about two thirds of the tank defines the sludge digester, while about one third of the tank defines the ozone disinfection tank.

In Phase II, the tank 308 is converted into a second SBR, such that the system includes two SBRs, each having a capacity of 138,000 gallons. A new ozone disinfection tank is provided with a capacity on the order of 45,500 gallons. A pair of sludge digester tanks are also provided, each having a capacity of about 45,500 gallons.

From the foregoing, it will be apparent that the wastewater treatment system of the present invention provides a modular system capable of being expanded to accommodate increasing quantities of wastewater. In addition, the present invention may be operated in an energy-conscious manner, such that as the system expands, the amount of energy required by the system at any given time remains approximately the same.

While several forms of the present invention have been illustrated and described, it will be apparent to those of ordinary skill in the art that various modifications and improvements can be made without departing from the spirit and scope of the invention. Accordingly, it is not intended that the invention be limited, except as by the appended claims.

We claim:

1. A method of treating wastewater comprising:

providing plural tanks;

erecting a temporary wall in one of the tanks to divide the tank into a disinfection tank and a digester tank;

designing at least one of the other tanks to be a first reactor tank;

directing wastewater to the reactor tank for processing of the wastewater;

directing processed water from the reactor tank to the disinfection tank to disinfect the processed water;

directing sludge from the reactor tank to the digester tank to further process the sludge;

as the demand for treated water increases, removing the temporary wall and converting the tank into a second reactor tank;

providing additional tanks, including at least one digester tank;

directing wastewater to at least one of the first and second reactor tanks to process the wastewater; and directing sludge from the respective reactor tanks to the digester tank to further process the sludge.

* * * * *

UNITED STATES PATENT AND TRADEMARK OFFICE
CERTIFICATE OF CORRECTION

PATENT NO. : 6,132,614
DATED : October 17, 2000
INVENTOR(S) : Johan A. Perslow, Mark E. Krebs and James A. Matthews It is certified that error appears in the above-identified patent and that said Letters Patent is hereby corrected as shown below:

<u>Title page,</u>
Item [73], Assignee should read: -- Pacific Advanced Civil Engineering, Inc., Huntington Beach, Calif. --

Signed and Sealed this

Thirtieth Day of July, 2002

Attest:

Attesting Officer

JAMES E. ROGAN
Director of the United States Patent and Trademark Office